United States Patent

[11] 3,628,757

| [72] | Inventor | Sixten E. Carlsson<br>Braviksvagen 35, Norrkoping, Sweden |
|---|---|---|
| [21] | Appl. No. | 3,766 |
| [22] | Filed | Jan. 19, 1970 |
| [45] | Patented | Dec. 21, 1971 |

[54] DEVICE FOR THE ARRESTING OF AIRCRAFT BY EITHER A NET OR A CABLE
3 Claims, 1 Drawing Fig.

[52] U.S. Cl. .................................................... 244/110 C
[51] Int. Cl. ............................................................ B64f 1/02
[50] Field of Search ............................................. 244/110 C, 110 R, 110 A, 110

[56] References Cited
UNITED STATES PATENTS

| 3,484,061 | 12/1969 | Niemkiewicz ............... | 244/110 R |
| 2,675,197 | 4/1954 | Hospers ....................... | 244/110 A |

Primary Examiner—Milton Buchler
Assistant Examiner—Paul E. Sauberer
Attorney—Munson & Fiddler ABSTRACT: An arresting device for aircraft consisting in a net and an arresting cable to be selectively stretched across a runway to intercept a landing aircraft, and to means by which either the cable or the net may be raised to aircraft-arresting position and also coupled to brakes that provide energy absorption to either the net or the cable. The operative position of either the net or the cable and the coupling of either of them to the brakes is selectively obtained by means of the raising or elevation of masts to which the net is connected.

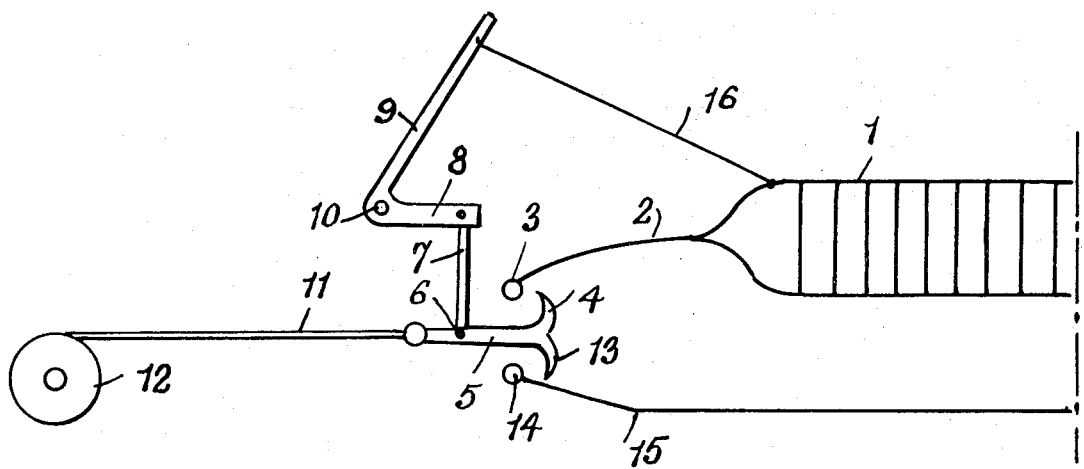
INVENTOR.
Sixten Einar Carlsson
BY
Munson & Fiddler
Attorneys

DEVICE FOR THE ARRESTING OF AIRCRAFT BY EITHER A NET OR A CABLE

BACKGROUND OF THE INVENTION

Coupling devices hitherto used were basically designed in such a manner that the hook-arresting cable is permanently connected to the energy-absorbing brakes to that any connection of the net to the brakes took place after the aircraft came into contact with and actuated the net in such a manner that both of its ends started moving and this movement actuated the final engagement to the brake and hook cable system. Under normal cases of arresting, this principle operates relatively well although there is the disadvantage that net-arresting always actuates the hook-arresting cable which must therefore be reset after each net-arresting procedure, in a similar manner to the net. This principle has an innate disadvantage which in some abnormal cases of arresting can have disastrous consequences. That is to say, if an aircraft not equipped with a hook is to use the arresting equipment, the net is raised in front of the aircraft but a connection between the two ends of the net and the energy-absorbing brakes will still not have been made. If, for some unknown reason, the aircraft should inadvertently actuate the hook-arresting cable, the function of connecting the net with the brakes will be rendered impossible in the succeeding instant, that is, the aircraft will come into contact with the net but the end of the net will not be coupled to the energy-absorbing brakes and the intended braking of the aircraft will therefore not take place. Such inadvertent actuation of the hook-arresting cable may be for several reasons namely, one or several of the aircraft landing wheels may be damaged and this may cause the hook cable to engage and be entrained by the aircraft; the aircraft pilot may inadvertently apply too much braking effort to the wheel brakes when running over the hook cable which may also cause entrainment of the cable; the aircraft may be obliged to carry out a belly landing which will inevitably cause the hook cable to be entrained. All of these cases render it impossible for the net to be connected to the brakes at some succeeding instant and braking will therefore not take place.

The present invention relates to a device for the arresting of aircraft by means of a combination type of arresting device, that is a device for arresting an aircraft by means of a hook and cable or by means of a net that extends between masts which can be raised or lowered.

The combination arresting device consists in principle of one or several energy-absorbing brakes located on each side of the landing strip. These brakes are connected by means of a coupling device, to a steel cable that is stretched across the landing strip for engaging with a hook, and to an arresting net located further away from the cable in the direction of travel of the aircraft, the net being also designed for arresting. If arresting by means of a hook is anticipated, the net will be located in a recess in the landing strip, whereas when arresting by means of a net is contemplated, the net will be raised by the use of a suitable device, that is by net masts located on each side of the landing strip.

Reference is to be had to the accompanying drawing, wherein an illustrative embodiment of the invention is disclosed, the FIGURE shown in the drawing disclosing an arrangement constructed in accordance with the invention.

The drawing shows a construction at one end of the arresting device, it being understood that a similar arrangement may be provided at the opposite end. The arresting net, which is adapted to be extended across the runway, is indicated at 1 and it is provided at its ends with the cable 2. The end of the cable 2 may terminate at 3 in a loop or ring or other suitable coupling element adapted for engagement with the bill 4 of a pivoted hook 5, said hook being pivotally connected at 6 to one end of a link 7 that is pivotally attached at its opposite end to an arm 8 extending angularly from a mast 9. The mast 9 is pivoted at 10. A cable or strap 11 attaches the hook 5 to a brake shown at 12.

The second bill 13 of the hook 5 is adapted for engagement with a loop 14 or other coupling element secured at the end of the line or cable 15.

The above arrangement is such that when the pivoted mast 9 is in a lowered position, its coupling to the hook 5 by means of the arm 8 and link 7 is such that the hook will be lowered and will have the bill 13 thereof engaging with the cable or line 15, and the cable will then be connected to the brakes, one of which is disclosed at 12, and the cable 15 is thus in readiness for engagement by the hook on a landing aircraft.

When it is desired to have the net 1 rather than the cable 15 arrest the aircraft, the net connected to the mast is properly positioned by the raising of the mast and this pivots the hook 5 upwardly to disengage it from the cable 15 and engages the bill 4 with the coupling 3 on the net 1 to thereby raise the net and connect it to the brakes. The raising of the net by the upward swing of the mast is performed by the connecting cable 16 that extends between the net and the mast.

The method of operation of the described structure is based on the idea that the alternative connection of the energy-absorbing brakes to either the hook-arresting cable or to the arresting net shall take place before the aircraft actuates either the cable or the net. As mentioned above, the position of the masts constitutes the selection for the type of arresting intended. If hook arresting is intended, the net masts are in the lowered position, that is, the net is in a lowered position of rest, while then being recessed in the landing strip. If net arresting is intended, the net masts are moved to the raised position and the net is thereupon stretched in a vertical plane. It is therefore logical to have the net masts determine the alternative connection of the brakes with either the cable or the arresting net.

A further advantage of this structure consists in the fact that during arresting by means of the net, the hook cable is disconnected from the energy-absorbing brakes and after arresting, only the net need be reset whereas the hook cable will remain in its original position. By this means, the arresting device can be reset more rapidly after net arresting as compared to existing devices, and this is an extremely desirable feature.

The optimum sought is the selective use of either the arresting cable or the net and while the hook 5 is shown as a coupling means by which either the net or the cable is operatively positioned, it will be apparent that other coupling means might be used to secure the desired result.

What I claim is:

1. An aircraft-arresting device for a longitudinally extending runway across which extend two spaced arresting means one of said arresting means comprising a hook-engaging cable, the other comprising a net adapted to be raised into aircraft engaging position said device comprising:
    a. energy-absorbing means adapted to be selectively connected to either one of said arresting means
    b. means responsive to the raising of said net into aircraft-engaging position for connecting said energy-absorbing means to said net and for disconnecting said energy-absorbing means from the hook-engaging cable,
    c. said means responsive to the raising of said net connecting said energy-absorbing means to the hook-engaging cable upon the collapsing of the net and disconnecting the energy-absorbing means from said net.

2. An aircraft-arresting device according to claim 1, wherein the connecting means is a double-billed hook, having one bill for engagement with the cable and its other bill for engagement with the net.

3. An arresting device for aircraft according to claim 1, wherein pivotal masts connected to the net are effective by their positioning to locate either the net or cable in an aircraft-arresting position.

* * * * *